US011030905B2

United States Patent
Sarti et al.

(10) Patent No.: US 11,030,905 B2
(45) Date of Patent: Jun. 8, 2021

(54) STOP PURPOSE CLASSIFICATION FOR VEHICLE FLEETS

(71) Applicant: VERIZON CONNECT IRELAND LIMITED, Tallaght Dublin (IE)

(72) Inventors: Leonardo Sarti, Sesto Fiorentino (IT); Luca Bravi, Scandicci (IT); Francesco Sambo, Padua (IT); Leonardo Taccari, Florence (IT); Matteo Simoncini, Pistoia (IT); Samuele Salti, Prato (IT); Alessandro Lori, Florence (IT)

(73) Assignee: Verizon Connect Development Limited, Dublin (IE)

( * ) Notice: Subject to any disclaimer, the term of this patent is extended or adjusted under 35 U.S.C. 154(b) by 0 days.

(21) Appl. No.: 16/949,473

(22) Filed: Oct. 30, 2020

(65) Prior Publication Data
US 2021/0049913 A1    Feb. 18, 2021

Related U.S. Application Data

(63) Continuation of application No. 15/958,914, filed on Apr. 20, 2018, now Pat. No. 10,847,036.

(30) Foreign Application Priority Data

Nov. 17, 2017    (IT) .................. 102017000131516

(51) Int. Cl.
*G08G 1/00*    (2006.01)
*G01C 21/34*    (2006.01)
(Continued)

(52) U.S. Cl.
CPC ......... *G08G 1/205* (2013.01); *G01C 21/3476* (2013.01); *G06Q 10/06* (2013.01);
(Continued)

(58) Field of Classification Search
CPC .......... G08G 1/205; H04W 4/02; H04W 4/44; G06Q 10/06316; G06Q 10/08; G06Q 10/06; G01C 21/3476
(Continued)

(56) References Cited

U.S. PATENT DOCUMENTS 5,880,958 A    3/1999  Helms et al.
6,611,755 B1   8/2003  Coffee et al.
(Continued)

OTHER PUBLICATIONS

Bohte, et al., "Deriving and validating trip purposes and travel modes for multi-day GPS-based travel surveys: A large-scale application in the Netherlands", Transportation Research Part C: Emerging Technologies, vol. 17, No. 3, pp. 285-297, 2009.
(Continued)

*Primary Examiner* — Jaime Figueroa

(57) ABSTRACT

A device receives location information and work order information associated with multiple vehicles, and groups the location information into engine off information, idling information, and journey information. The device combines, based on the journey information, the engine off information and the idling information to generate vehicle stop information associated with the plurality of vehicles, and matches corresponding work order information with the vehicle stop information to generate matched information. The device extracts stop-wise features, points of interest features, stop cluster features, and sequential features from the vehicle stop information, and utilizes the stop-wise features, the points of interest features, the stop cluster features, and the sequential features with a model to determine work order stops and non-work order stops for the multiple vehicles. The device provides information associated with the work order stops and the non-work order stops for the multiple vehicles.

20 Claims, 11 Drawing Sheets

(51) Int. Cl.
*H04W 4/44* (2018.01)
*G06Q 10/08* (2012.01)
*H04W 4/02* (2018.01)
*G06Q 10/06* (2012.01)

(52) U.S. Cl.
CPC ....... *G06Q 10/06316* (2013.01); *G06Q 10/08* (2013.01); *H04W 4/02* (2013.01); *H04W 4/44* (2018.02)

(58) Field of Classification Search
USPC ........................................................ 701/29.3
See application file for complete search history.

(56) References Cited

U.S. PATENT DOCUMENTS

| | | | |
|---|---|---|---|
| 6,718,263 | B1 | 4/2004 | Glass et al. |
| 9,037,406 | B2 | 5/2015 | Mason et al. |
| 9,230,232 | B2 | 1/2016 | McCormick et al. |
| 9,313,616 | B2* | 4/2016 | Mitchell ............... G06Q 10/083 |
| 2003/0018428 | A1 | 1/2003 | Knockeart et al. |
| 2004/0039504 | A1 | 2/2004 | Coffee et al. |
| 2005/0004757 | A1 | 1/2005 | Neeman et al. |
| 2009/0088924 | A1* | 4/2009 | Coffee ...................... B28C 5/422 701/31.4 |
| 2009/0248219 | A1* | 10/2009 | Kawauchi ................ B60R 25/33 701/1 |
| 2012/0253892 | A1 | 10/2012 | Davidson |
| 2012/0256770 | A1* | 10/2012 | Mitchell ................. G08G 1/127 340/989 |
| 2013/0007626 | A1* | 1/2013 | Adams ................... G07C 5/008 715/738 |
| 2013/0069803 | A1 | 3/2013 | McCormick et al. |
| 2013/0096815 | A1 | 4/2013 | Mason et al. |
| 2013/0339098 | A1 | 12/2013 | Looman et al. |
| 2015/0077276 | A1* | 3/2015 | Mitchell ............... G06Q 10/083 340/995.1 |
| 2015/0161827 | A1 | 6/2015 | Getchius |
| 2015/0248795 | A1 | 9/2015 | Davidson |
| 2015/0317589 | A1 | 11/2015 | Anderson et al. |
| 2018/0268359 | A1* | 9/2018 | Soubhagya ......... G08G 1/096741 |

OTHER PUBLICATIONS

Bolbol, et al., "Inferring hybrid transportation modes from sparse GPS data using a moving window SVM classification", Computers, Environment and Urban Systems Elsevier Science Ltd. UK, vol. 36, No. 6, Nov. 2012, pp. 526-537.
Breiman, "Random Forests", Machine Learning, 45, pp. 5-32, 2001.
Ester, et al., "A density-based algorithm for discovering clusters in large spatial databases with noise", AAAI Press, 1996, pp. 226-231.
Friedman, et al., "The elements of statistical learning", Springer series in statistics New York, 2001, vol. 1.
Gingerich, et al., "Classifying the purpose of stopped truck events: an application of entropy to GPS data", Transportation Research Part C: Emerging Technologies, vol. 64, pp. 17-27, 2016.
Gong, et al., "Identification of activity stop locations in GPS trajectories by density-based clustering method combined with support vector machines", Journal of Modem Transportation, vol. 23, No. 3, pp. 202-213, 2015.
Gonzales, et al., "Automating mode detection using neural networks and assisted GPS data collected using GPS-enabled mobile phones", In: 15th World congress on intelligent transportation systems, 2008, 12 pages.
Jiang, et al., "Learning from contextual information of geo-tagged web photos to rank personalized tourism attractions", Neurocomputing, vol. 119, pp. 17-25, 2013.
Li, et al., "Mining User Similarity Based on Location History", in Proceedings of the 16th ACM SIGSPATIAL international conference on Advances in geographic information systems. ACM, 2008, p. 34.
LV, et al., "The discovery of personally semantic places based on trajectory data mining", Neurocomputing, vol. 173, pp. 1142-1153, 2016.
Palma, et al., "A Clustering-based Approach for Discovering Interesting Places in Trajectories", in Proceedings of the 2008 ACM symposium on Applied computing. ACM, 2008, pp. 863-868.
Sambo, et al., "Integration of GPS and satellite images for detection and classification of fleet hotspots", in 20th International Conference on Intelligent Transportation Systems (ITSC). IEEE, 2017.
Simoncini, et al., "Vehicle classification from low frequency GPS data", IEEE 16th International Conference on Data Mining Workshops (ICDMW), 2016, 8 pages.
Sun, et al., "Vehicle classification using GPS data", Transportation Research Part C: Emerging Technologies. 2013, 16 paqes.
Wilcoxon, "Individual comparisons by ranking methods", Biometrics bulletin, vol. 1, No. 6, pp. 80-83, 1945.
Wolf, et al., "Elimination of the travel diary: Experiment to derive trip purpose to Derive Trip Purpose From GPS Travel Data", Transportation Research Record: Journal of the Transportation Research Board, No. 1768, pp. 125-134, 2001.
Xiao, et al., "Travel mode detection based on GPS track data and Bayesian networks", Computers, Environment and Urban Systems, 2015, 15 pages.
Yang, et al., "Urban freight delivery stop identification with GPS data", Transportation Research Record: Journal of the Transportation Research Board, No. 2411, pp. 55-61, 2014.
Zheng, "Learning transportation mode from raw GPS data for geographic applications on the web", In: Proceedings of the 17th international conference on World Wide Web. ACM, 2008, 10 pages.

\* cited by examiner

STOP PURPOSE CLASSIFICATION FOR VEHICLE FLEETS

RELATED APPLICATION

This application is a continuation of U.S. patent application Ser. No. 15/958,914, entitled "STOP PURPOSE CLASSIFICATION FOR VEHICLE FLEETS," filed Apr. 20, 2018, which claims priority under 35 U.S.C. § 119 to Italian Patent Application No. 102017000131516, filed on Nov. 17, 2017, the contents of which are incorporated by reference herein in their entireties.

BACKGROUND

A vehicle fleet can include multiple vehicles, such as cars, vans, trucks, specialist vehicles (e.g., mobile construction machinery), and/or the like used for a work purpose. Vehicle fleet management includes management of a range of functions associated with the vehicle fleet, such as vehicle financing, vehicle maintenance, vehicle telematics (e.g., tracking and diagnostics), driver management, speed management, fuel management, health and safety management, and/or the like. Vehicle fleet management allows entities (e.g., companies), which rely on transportation in business, to remove or minimize risks associated with vehicle investment, to improve efficiency and productivity, to reduce transportation and staff costs, to provide compliance with government regulations, and/or the like.

DETAILED DESCRIPTION OF PREFERRED EMBODIMENTS

The following detailed description of example implementations refers to the accompanying drawings. The same reference numbers in different drawings can identify the same or similar elements.

A vehicle fleet management system utilizes global positioning system (GPS) data to inform a fleet manager of locations of a fleet of vehicles. For example, a vehicle can include or be associated with a GPS device that provides a current location of the vehicle to the vehicle fleet management system.

Some implementations, described herein, can provide a classification platform that trains a machine learning model, based on known work order stops and non-work order stops, to generate a data set. The machine learning model, once trained with the data set, can automatically classify vehicle stops as work related (e.g., a work order or a business stop) or non-work related (e.g., a non-work order or a personal stop) based on location (e.g., GPS) information and without knowing work order information (e.g., unlabeled or unknown stops) associated with a fleet of vehicles. For example, the classification platform can receive the location information from user devices associated with the vehicles, and can identify stops associated with the vehicles by clustering or grouping the location information. The classification platform can extract stop-wise features, points of interest (POI) features, stop cluster features, and sequential features from information associated with the identified stops. The classification platform can utilize the stop-wise features, the POI features, the stop cluster features, and the sequential features to determine work order stops and non-work order stops associated with the vehicles.

Figure 1A:
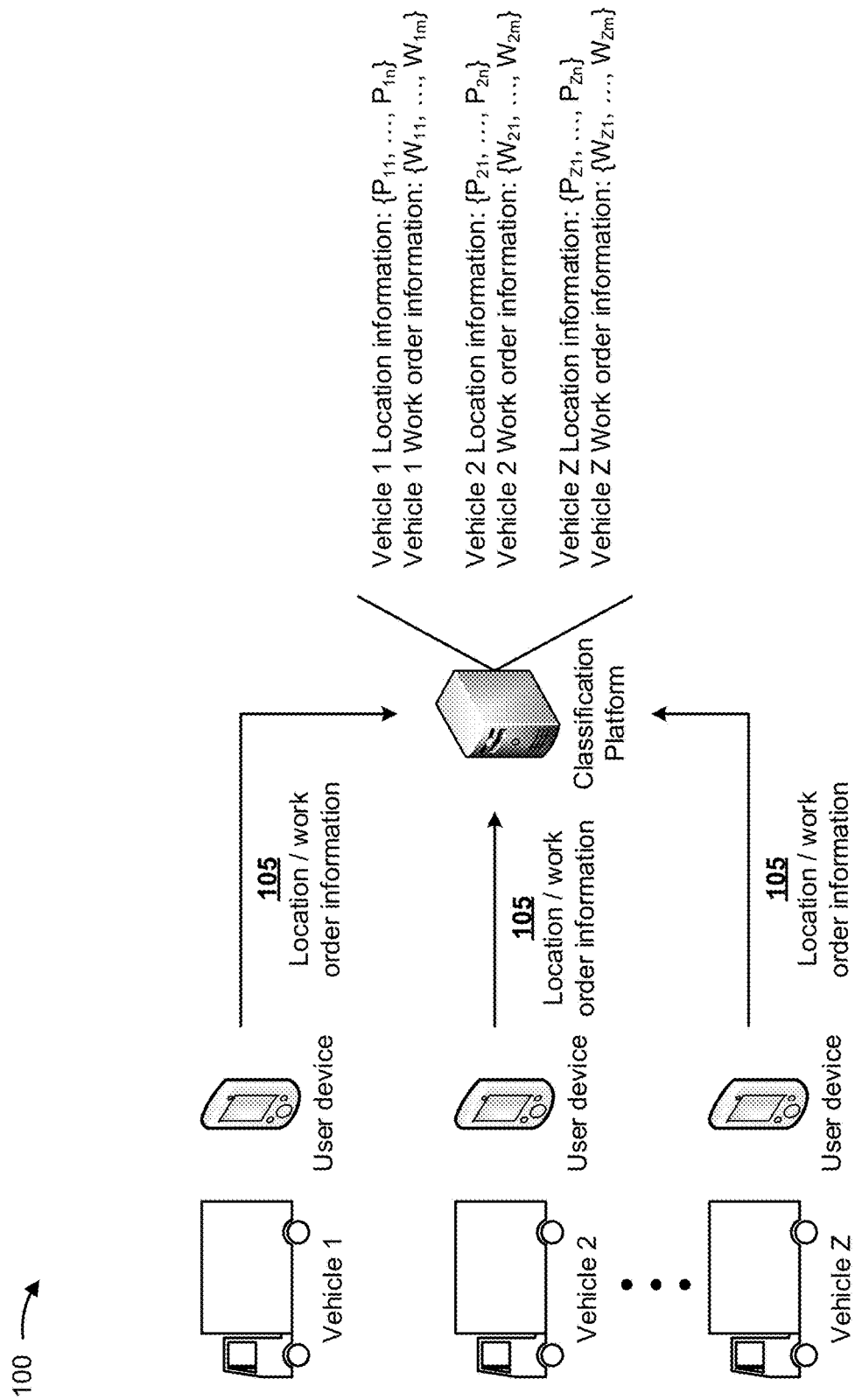
FIGS. 1A-1H are diagrams of an overview of an example implementation described herein.

FIGS. 1A-1H are diagrams of an overview of an example implementation 100 described herein. As shown in FIG. 1A, assume that user devices are associated with corresponding vehicles (e.g., vehicle 1, vehicle 2, . . . , vehicle Z, where Z>2) of a vehicle fleet. As shown by reference number 105, the user devices can provide location information and work order information, associated with each vehicle, to a classification platform. The classification platform can receive the location information and the work order information from the user devices, and can store the location information and the work order information. In some implementations, the classification platform can only receive the location information from the user devices, and the user devices (or a vehicle fleet management system associated the user devices) cannot provide the work order information.

In some implementations, the location information for each vehicle can include GPS information, information indicating a geographic location of the vehicle (e.g., in latitude and longitude at a particular point in time provided by a time stamp), information indicating a velocity of the vehicle, and/or the like. For example, the location information can indicate that the first vehicle (vehicle 1) is located at a particular latitude and longitude (e.g., 39° 44' North latitude and 75° 32' West longitude), a particular address (e.g., 123 ABC Street in ABC Town), and/or the like. In some implementations, the work order information for each vehicle can include information indicating a schedule of work tasks to be completed by a driver of the vehicle over a period of time, information indicating locations of where the work tasks are to be completed, information associated with past stops of the vehicle, information associated with purposes of the past stops (e.g., work order or non-work order), and/or the like. For example, the work order information can indicate that the second vehicle (vehicle 2) is scheduled to deliver packages to twenty-five different locations in eight hours. In some implementations, the work order information can be received from devices other than the user devices, such as a fleet management system, one or more devices associated with an owner or a manager of the vehicle fleet, and/or the like.

In some implementations, the user devices can provide vehicle information associated with the vehicles to the classification platform. The vehicle information can include information associated with an operating status of a vehicle (e.g., information associated with whether an engine of the vehicle is turned off, whether the engine is turned on, whether the engine is operating properly, a fuel level of the vehicle, and/or the like), information indicating a number of passengers in the vehicle, information generated by an electronic control unit (ECU) or an engine control module (ECM) of the vehicle, and/or the like.

As further shown in FIG. 1A, the location information for the first vehicle can include a sequence of GPS pings (e.g., $\{P_{11}, \ldots, P_{1n}\}$) that characterizes routes traveled by the first vehicle, the location information for the second vehicle can include a sequence of GPS pings (e.g., $\{P_{21}, \ldots, P_{2n}\}$) that characterizes routes traveled by the second vehicle, and the location information for the Zth vehicle can include a sequence of GPS pings (e.g., $\{P_{Z1}, \ldots, P_{Zn}\}$) that characterizes routes traveled by the Zth vehicle. In some implementations, each GPS ping (e.g., $P_i$) can include a vehicle identifier (e.g., $v_i$), a latitude and longitude, or position, of the vehicle (e.g., $p_i$), an odometer distance of the vehicle (e.g., $d_i$), a timestamp (e.g., $t_i$), an event code (e.g., $e_i$) that provides status information about the vehicle, and/or the like.

As further shown in FIG. 1A, the work order information for the first vehicle can include a sequence of information (e.g., $\{W_{11}, \ldots, W_{1m}\}$) that characterizes a schedule of work tasks for a driver of the first vehicle, the work order information for the second vehicle can include a sequence of information (e.g., $\{W_{21}, \ldots, W_{2m}\}$) that characterizes a schedule of work tasks for a driver of the second vehicle, and the work information for the Zth vehicle can include a sequence of information (e.g., $\{W_{Z1}, \ldots, W_{Zm}\}$) that characterizes a schedule of work tasks for a driver of the Zth vehicle. In some implementations, each work order data element (e.g., $W_i$) can include the vehicle identifier (e.g., $v_i$), the position of the work order (e.g., $p_i$), the timestamp (e.g., $t_i$), a status code (e.g., $c_i$, indicating pending, started, or completed) associated with a work task of the vehicle, and/or the like. In some implementations, there can be vehicles for which no work order information exists (e.g., vehicles for which work order information is not used to train the machine learning model). In such implementations, the machine learning model can be utilized (e.g., in a prediction phase) to infer whether vehicle stops, of such vehicles, are work stops or non-work stops.

Figure 1B:
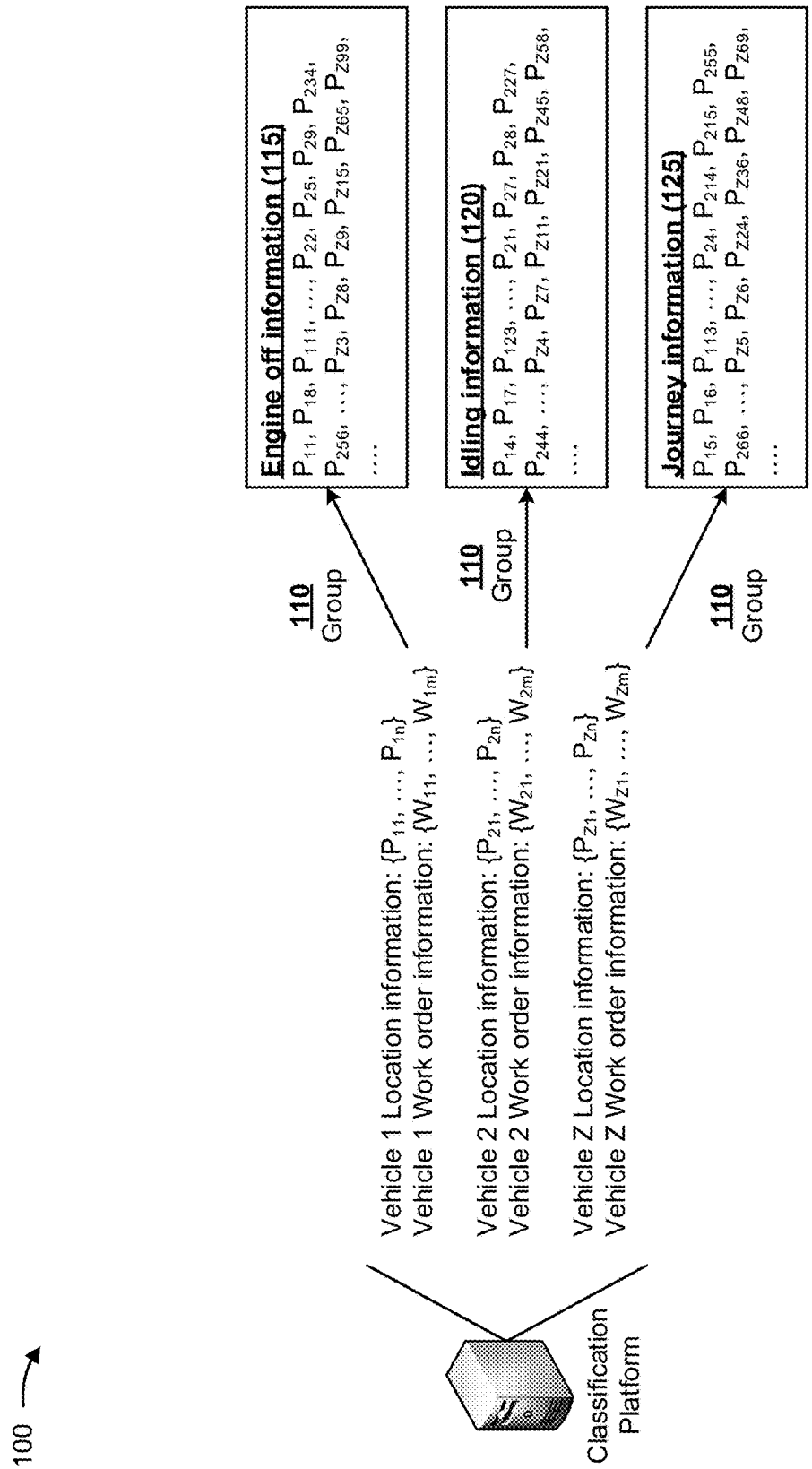

As shown by reference number 110 in FIG. 1B, the classification platform can group the location information into multiple groups that describe activities of the vehicles. For example, as shown in FIG. 1B, the classification platform can group the location information into engine off information 115, idling information 120, and journey information 125. Engine off information 115 can include location information associated with engine off events (e.g., when the engines of the vehicles are turned off), and such location information can be generated when the engines are turned off. No further location information is generated from the vehicles while the engines are turned off. Idling information 120 can include location information associated with vehicles with engines turned on, but where the vehicles are not moving or are moving slowly in a small geographic area. For example, assume that $H(p_i, p_{i-1})$ is a haversine distance between two points, and that a pair of consecutive GPS signals ($P_{i-1}$ and $P_i$) are associated with a particular vehicle. In such an example, the particular vehicle is determined to be idling when the following constraints are satisfied:

$$\frac{H(p_i, p_{i-1})}{t_i - t_{i-1}} \leq a \text{ threshold} \qquad (1)$$

(e.g., 1.4 meters/second), to ensure that the speed is close to zero; and (2) $H(pi; pi-1) \leq a$ threshold (e.g., 150 meters), to ensure that Pi and Pi−1 are actually close and to avoid artifacts due to lost GPS signals. Journey information 125 can include location information that is not grouped into engine off information 115 and idling information 120.

In some implementations, the classification platform can utilize a rule-based clustering technique to group the location information into engine off information 115, idling information 120, and journey information 125. The rule-based clustering technique can be utilized for the location information clustering since the location information can include a large amount of information, and the rule based clustering is linearly complex with respect to the input size. Furthermore, the rule-based clustering technique can be parallelized and can efficiently utilize modern parallel computing frameworks. In some implementations, the classification platform can utilize another clustering technique (e.g., a K-Means technique, a hierarchical clustering technique, a mean shift technique, a density-based spatial clustering of applications with noise (DBSCAN) technique, and/or the like) to group the location information into engine off information 115, idling information 120, and journey information 125. In some implementations, the classification platform can classify each GPS signal as an engine off GPS signal, an idling GPS signal, or a journey GPS signal, and can utilize the rule-base clustering technique on chronologically adjacent engine off GPS signals and idling signals, not separated by journey GPS signals, to identify vehicle stops.

Figure 1C:
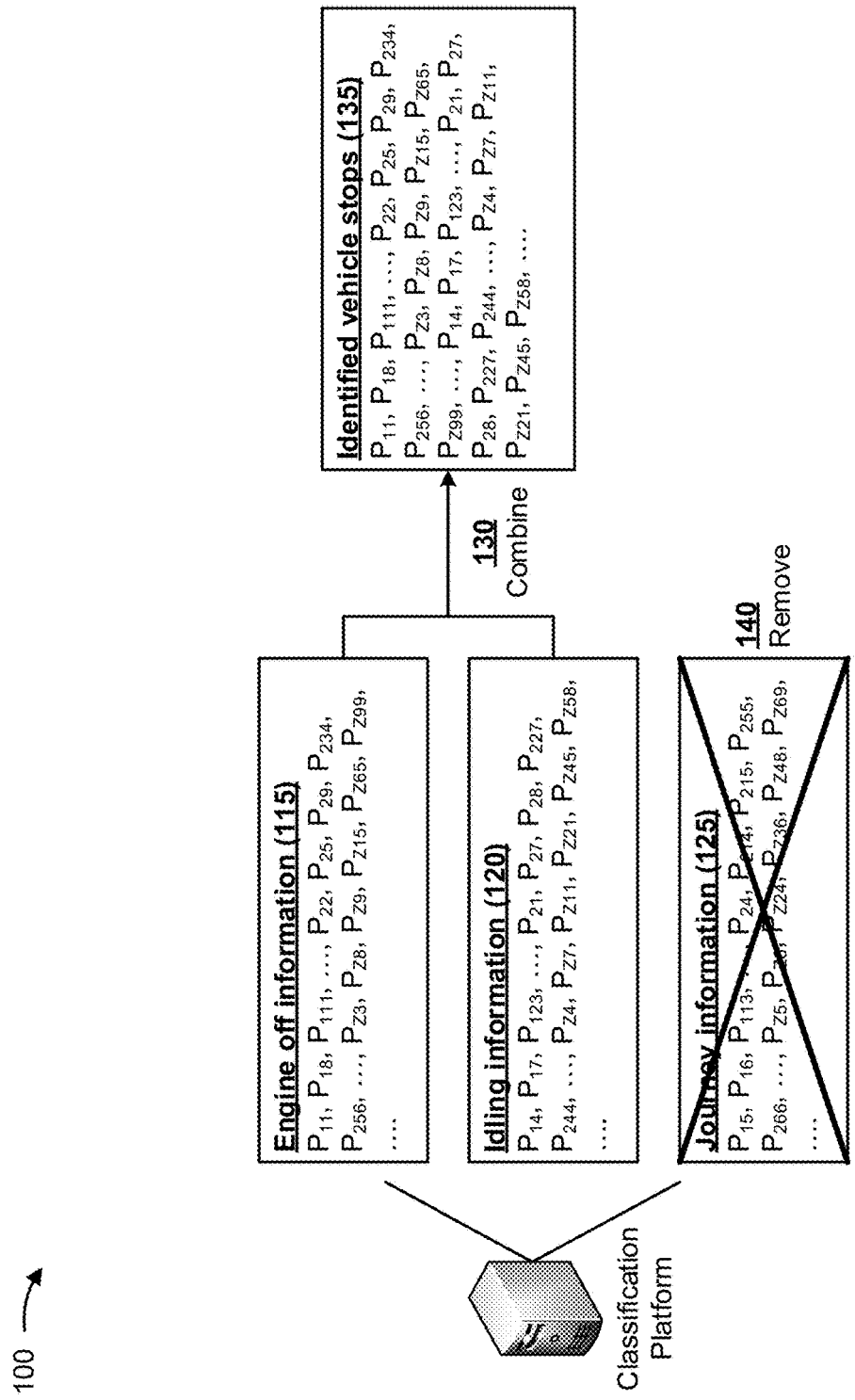

As shown by reference number 130 in FIG. 1C, the classification platform can combine engine off information 115 and idling information 120 to form information indicating identified vehicle stops 135. In some implementations, engine off information 115, idling information 120, and journey information 125 can be sorted chronologically for each vehicle, by the classification platform, before engine off information 115 and idling information 120 are combined. In some implementations, the identified vehicle stops 135 can include consecutive engine off information 115 and idling information 120 that are not separated by journey information 125. As shown by reference number 140, the classification platform can remove and/or discard journey information 125 (e.g., from storage) after the identified vehicle stops 135 are determined.

In some implementations, an identified vehicle stop can include a group of chronologically consecutive GPS signals that are associated with idling or engine off conditions and that satisfy spatiotemporal locality constraints. Each identified vehicle stop can include several characteristics, such as a number of aggregated GPS signals, a start and an end of the vehicle stop (e.g., first and last timestamps of GPS signals associated with the vehicle stop), a stop duration (e.g., a time between the end and the start of the vehicle stop), maximum and minimum latitudinal and longitudinal coordinates of the GPS signals, and/or the like. In some implementations, a vehicle stop need not be associated with an engine off GPS signal, but can include only idling GPS signals. For example, a driver of package delivery companies can make deliveries without turning off a vehicle.

In some implementations, identified vehicle stops 135 can identify areas where vehicles perform particular types of tasks. For example, a vehicle stop can include information associated with time spent parking the vehicle, time spent in close proximity to the stop, time spent finding the parking place, and/or the like. In another example, a vehicle can stop and move multiple times in a small area, such as when a vehicle is located at a depot and is loaded at multiple load points, when a vehicle is unloading cargo to a customer, and/or the like.

Figure 1D:
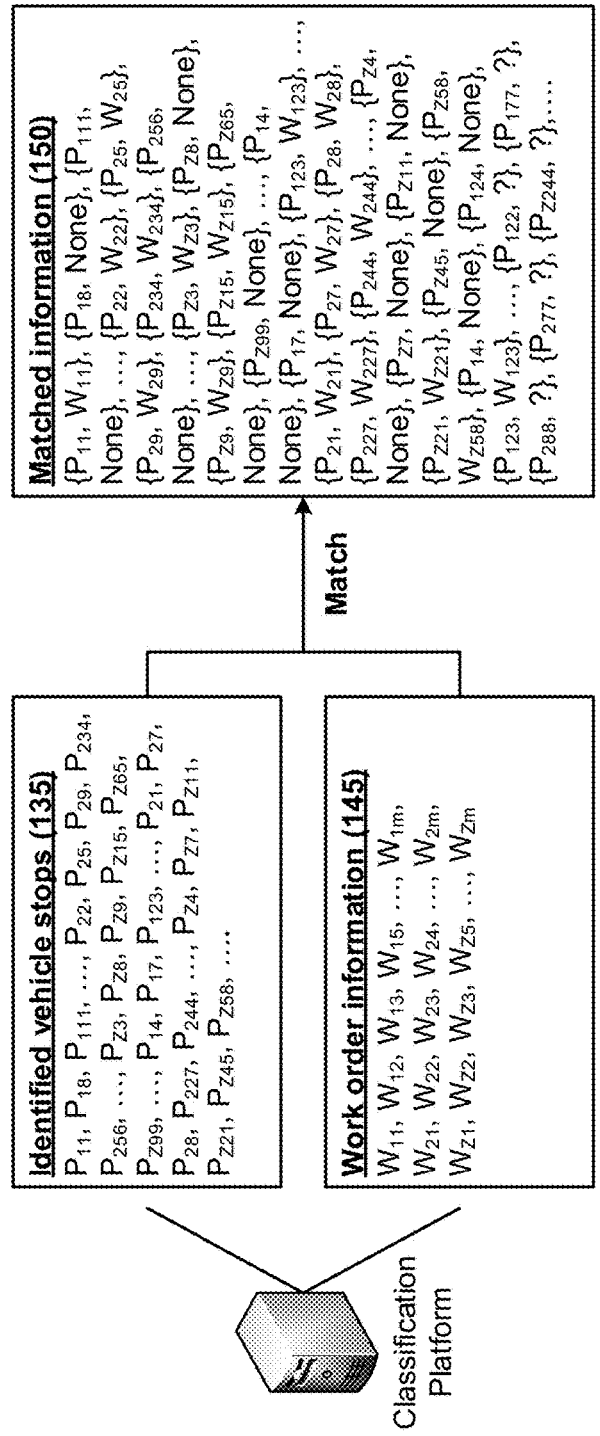

As shown by reference number 145 in FIG. 1D, the classification platform can store the work order information (e.g., $\{W_{11}, \ldots, W_{1m}\}$, $\{W_{21}, \ldots, W_{2m}\}$, and $\{W_{Z1}, \ldots, W_{Zm}\}$). As further shown in FIG. 1D, the classification platform can match identified vehicle stops 135 with corresponding work order information. In some implementations, if the work order information does not match a particular one of identified vehicle stops 135, the classification platform can provide a designation (e.g., "None") indicating that the work order information does not match the particular one of identified vehicle stops 135. In some implementations, if work order information does not exist for a particular one of identified vehicle stops 135, the classification platform can provide a designation (e.g., "?") indicating that the work order information does not exist for the particular one of identified vehicle stops 135. In some implementations, the classification platform can combine and store the matching identified vehicle stops 135 and the corresponding work order information as matched information 150. In some implementations, the classification platform can combine a GPS signal associated with a matching identified vehicle stop (e.g., $P_{11}$) with corresponding work order information (e.g., $W_{11}$) to create a matched pair (e.g., $\{P_{11}, W_{11}\}$). In instances where the work order information does not match a particular identified vehicle stop, the classification platform can combine a GPS signal associated with the particular identified vehicle stop (e.g., $P_{18}$) with a non-match indicator (e.g., None) to create a pair (e.g., $\{P_{18}, \text{None}\}$). In instances where the work order information does not exist a particular identified vehicle stop, the classification platform can combine a GPS signal associated with the particular identified vehicle stop (e.g., $P_{288}$) with a non-existing indicator (e.g., ?) to create a pair (e.g., $\{P_{288}, ?\}$).

In some implementations, the classification platform can create the pairs associated with work order information (e.g., $\{P, W\}$ and $\{P, \text{None}\}$) for customers that provide work order information, and can utilize such pairs as a training set of data to train the machine learning model. In some implementations, the machine learning model can include a mathematical function, and training the machine learning model can include finding best parameters for the machine learning model (e.g., values that minimize a certain score on the training set, where the score assesses a quality of the machine learning model). In some implementations, for customers that do not provide work order information, the classification platform can utilize the machine learning model to automatically classify vehicle stops for such customers.

In some implementations, the classification platform can determine a vehicle stop to be a work order vehicle stop if the vehicle stop matches temporally and spatially with a work order item. In some implementations, a spatial match can be considered satisfied in a different way for vehicle stops that are associated with only idling GPS signals, and vehicle stops associated with at least one engine off GPS signal. For example, the classification platform can consider vehicle stops associated with only idling GPS signals to be work order vehicle stops if a centroid of the vehicle stops is within a haversine distance of predetermined quantity (e.g., 150 meters) with respect to a location of the work order information associated a particular vehicle. The classification platform can consider a vehicle stop associated with at least one engine off GPS signal to be a work order vehicle stop if the at least one engine off GPS signal is within the haversine distance of the predetermined quantity with respect to the location of the work order information. In some implementations, a temporal match can be considered satisfied if a time period, between a start time and an end time of a vehicle stop, intersects a time period associated with when a work order was started and completed. In some implementations, the classification platform can utilize the determination of whether the vehicle stop matches temporally and spatially with a work order item to create the training set of data for training the machine learning model.

Figure 1E:
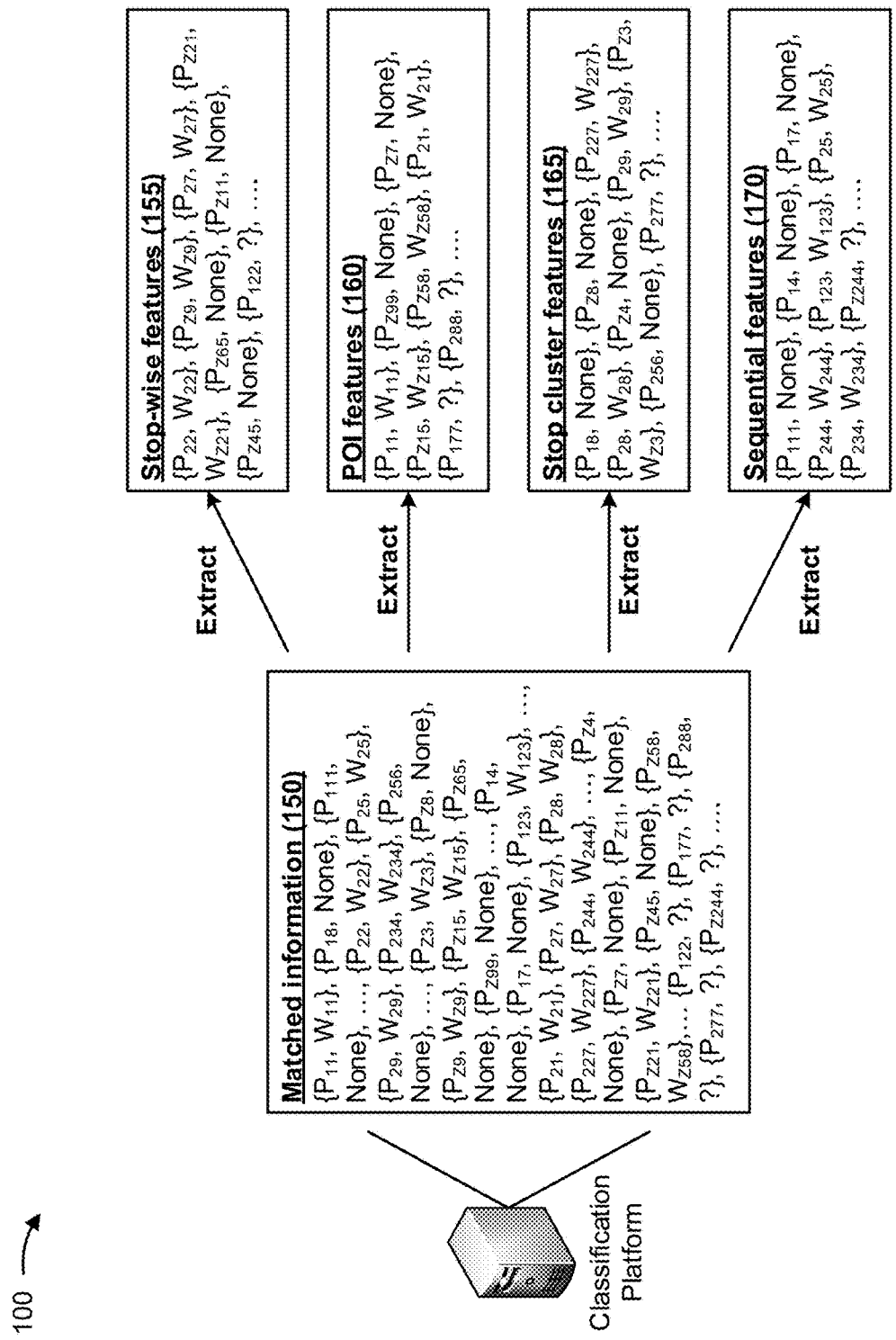

As shown in FIG. 1E, the classification platform can extract multiple (e.g., over one-hundred) features from matched information 150 (e.g., that includes work order information for customers that provide work order information, and does not include work order information for customers that do not provide work order information). In some implementations, the classification platform can extract the features into particular types of features, such as stop-wise features 155, POI features 160, stop cluster features 165, and sequential features 170.

In some implementations, stop-wise features 155 can include features associated with a stop duration (e.g., a time between a first GPS signal and a last GPS signal associated with a vehicle stop), a start time of the vehicle stop (e.g., an hour of a day, a day of a week, a day of a month, a day of a year, and/or the like), time spent with the engine off (e.g., for each engine off GPS signal, the time spent can include a time between the engine off GPS signal and a first following GPS signal that is not an engine off GPS signal), a geographic shape associated with a vehicle stop (e.g., the GPS signals associated with the vehicle stop can be used to determine a geographical area that includes a width, a height, an area, and/or the like), a vehicle stop type (e.g., an engine off vehicle stop if the vehicle stop is associated with at least one engine off GPS signal, or an idling vehicle stop otherwise), an odometer distance from a first GPS signal to a last GPS signal of the vehicle stop, a sum of haversine distances between consecutive GPS signals associated with the vehicle stop, a haversine distance between a first GPS signal and a last GPS signal of the vehicle stop (e.g., this feature, combined with the odometer distance feature and the geographic shape feature can aid in distinguishing between vehicle stops where the vehicle moves around in a specific geographic area, and vehicle stops where the vehicle slowly moves in a straight direction), a total count of GPS signals associated with the vehicle stop, an average speed of the vehicle (e.g., as determined by odometer readings associated with a first GPS signal and a last GPS signal of the vehicle stop, divided by a duration of the vehicle stop), a number of engine off GPS signals associated with the vehicle stop, and/or the like.

In some implementations, POI features 160 can include features associated with points of interest in a geographic area surrounding each vehicle stop (e.g., as obtained from an external data source, such as Google Maps, OpenStreetMap, and/or the like). In some implementations, POI features 160 can include features identifying POI types, such as a bank, a university, a hotel, a restaurant, a rest area, a grocery store, a school, a shopping center, a gas station, an open parking area, a vehicle repair facility, and/or the like. For each of these POI types, the classification platform can generate a feature that includes information associated with a shortest distance from a location of the POI type to a location corresponding to an engine off GPS signal.

In some implementations, stop cluster features 165 can include features that describe characteristics of vehicle stops surrounding a particular vehicle stop, so that the classification platform can characterize a geographic area associated with the particular vehicle stop. In some implementations, the classification platform, for each vehicle stop, analyzes a radius (e.g., of 250 meters) around the vehicle stop and collects statistics about surrounding vehicle stops, such as a vehicle entropy ($E_v$) calculated as:

$$E_v = \sum_{v \in V} \frac{n_v}{N} \ln\left(\frac{n_v}{N}\right),$$

where V is a set of vehicles in a vehicle fleet, N is a total number of vehicle stops for all of the vehicles of the vehicle fleet inside the radius, and $n_v$ is a total number of vehicle stops of a particular vehicle (v) inside the radius; an average, a sum, a maximum, and a minimum duration of the vehicle stops within the radius; a number of nearby stops, and/or the like.

In some implementations, sequential features 170 can include features associated with a sequence of vehicle stops performed by each vehicle for each vehicle stop. In some implementations, sequential features 170 can include vehicle stop sequences of a vehicle in a time period (e.g., a day), which enables the classification platform to classify personally semantic locations. For example, it is unlikely that a driver of a vehicle will have two consecutive lunch stops in a single day.

In some implementations, a sequence of vehicle stops performed by a vehicle for a particular vehicle stop can include at least two vehicle stops prior to the particular vehicle stop and at least two vehicle stops after the particular vehicle stop. From the four vehicle stops (e.g., the least two vehicle stops prior to the particular vehicle stop and the at least two vehicle stops after the particular vehicle stop), the classification platform can calculate a set of features, for the four vehicle stops, based on the stop-wise features and the POI features associated with the four vehicle stops, such as stop duration, time with the engine off, distance from a POI, and/or the like. In some implementations, the classification platform can calculate, for the four vehicle stops, time periods between the four vehicle stops, distances between the four vehicle stops, and/or the like. The time periods and distances between the four vehicle stops can enable the classification platform to identify stops that are located far apart (e.g., which can indicate that the vehicle took a long detour to reach a particular location and that the particular location is semantically relevant). In some implementations, based on a sequence of vehicle stops in a working day by a vehicle, the classification platform can calculate a ranking of each vehicle stop in the working day (e.g., indicating a fraction of vehicle stops that occurred before each vehicle stop on the same day), a temporal percentage of the day covered by each vehicle stop (e.g., indicating a fraction of time of the working day elapsed before each vehicle stop), and/or the like.

Figure 1F:
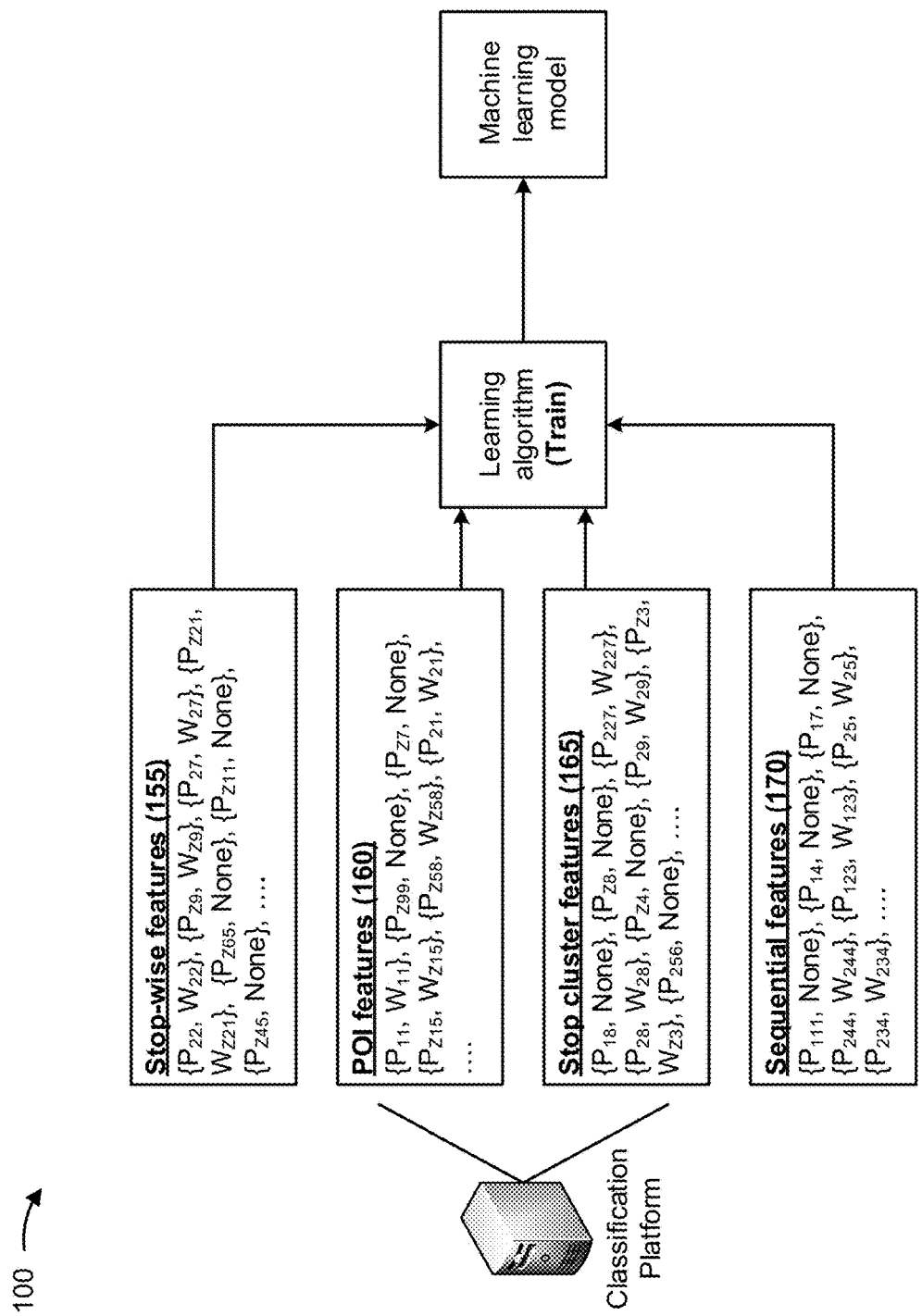

As shown in FIG. 1F, the classification platform can utilize stop-wise features 155, POI features 160, stop cluster features 165, and sequential features 170 (e.g., associated with work order information provided by customers) to train a learning algorithm in order to determine a machine learning model. In some implementations, the classification platform can utilize one or more of stop-wise features 155, POI features 160, stop cluster features 165, or sequential features 170 to train the learning algorithm in order to determine the machine learning model. In some implementations, the machine learning model can include a random forest classifier model, a support vector machine model, a neural network model, a gradient boosted trees model, and/or the like. In some implementations, the machine learning model can include a technique that automatizes a computer decision without directly programming the decision, and that allows learning from a set of examples (e.g., a training set). In some implementations, the machine learning model can perform binary classification in order to determine whether particular data belongs to one class or to another class. In some implementations, the machine learning model can be created based on the training set and the learning algorithm, and can describe learned behavior. In some implementations, training the machine learning model with the training set can provide optimal values for parameters of the machine learning model (e.g., the parameters can be optimal based on a cost function that estimates an error committed by the machine learning model).

Figure 1G:
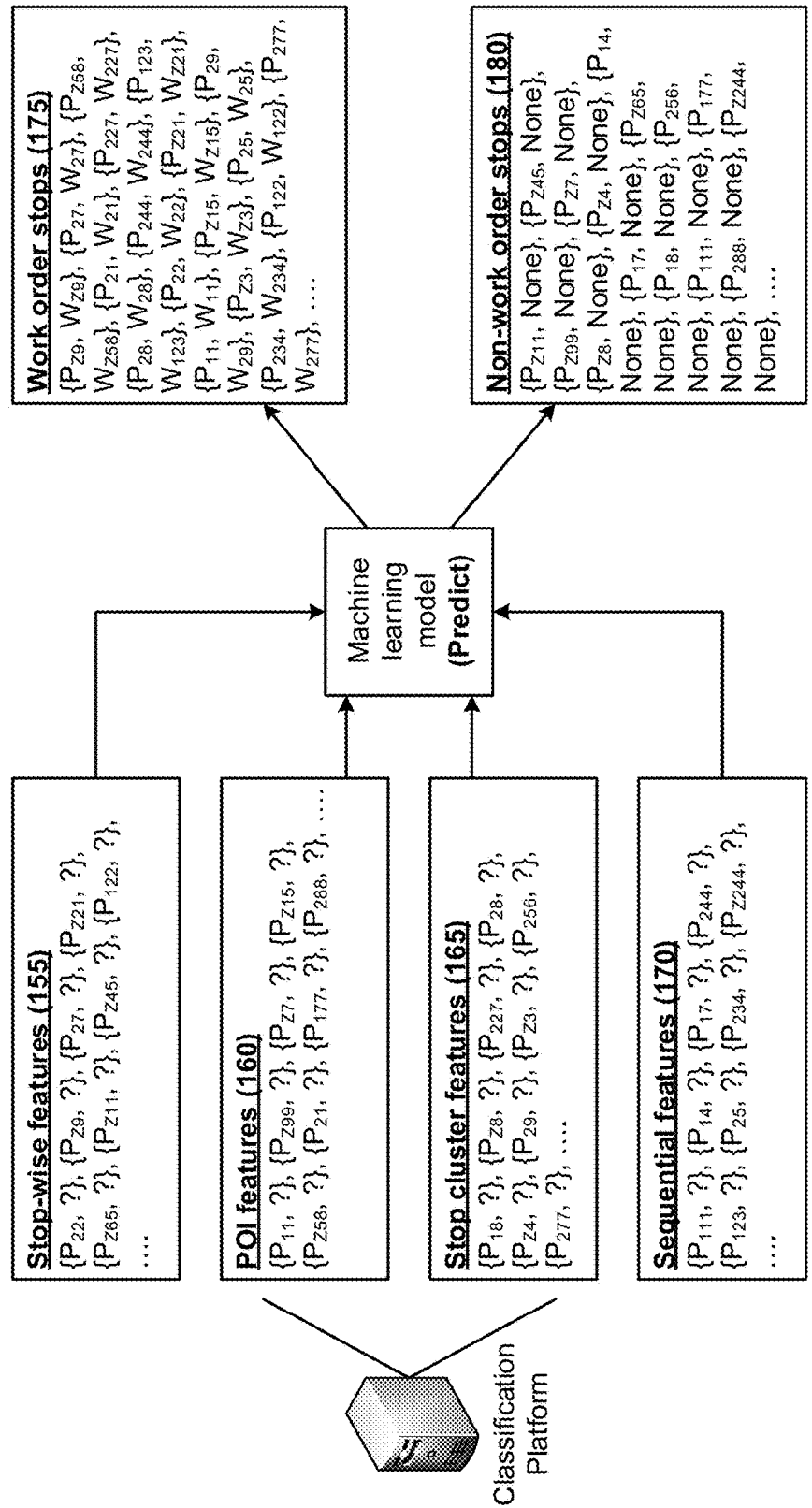

As shown in FIG. 1G, the classification platform can utilize stop-wise features 155, POI features 160, stop cluster features 165, and sequential features 170 (e.g., associated with work order information provided by customers) with the trained machine learning model to determine inferred information associated with work order stops 175 (e.g., work related vehicle stops) and non-work order stops 180 (e.g., non-work related vehicle stops). In some implementations, the classification platform can utilize one or more of stop-wise features 155, POI features 160, stop cluster features 165, or sequential features 170 with the trained machine learning model to determine the inferred information associated with work order stops 175 and non-work order stops 180.

In some implementations, work order stops 175 can include vehicle stops related to work orders, as determined by the location information and the work order information received from the vehicles and/or a vehicle fleet management system. For example, each of work order stops 175 can include a matched pair of information (e.g., $\{P_{Z9}, W_{Z9}\}$) that includes one or more GPS signals associated with an identified vehicle stop (e.g., $P_{Z9}$) and inferred work order information (e.g., $W_{Z9}$) for the identified vehicle stop.

In some implementations, non-work order stops 180 can include vehicle stops that are not related to work orders, as determined by the location information and the work order information received from the vehicles and/or a vehicle fleet management system. For example, each of non-work order stops 180 can include a matched pair of information (e.g., $\{P_{Z11}, \text{None}\}$) that includes one or more GPS signals associated with an identified vehicle stop (e.g., $P_{Z11}$) and an indication inferring that there is no corresponding work order information (e.g., None) for the identified vehicle stop.

In some implementations, the classification platform can store the inferred information associated with work order stops 175 and non-work order stops 180 in storage associated with the classification platform. In some implementations, the classification platform can provide the inferred information associated with work order stops 175 and non-work order stops 180 for display to a user of the classification platform, to another device for display, and/or the like.

Figure 1H:
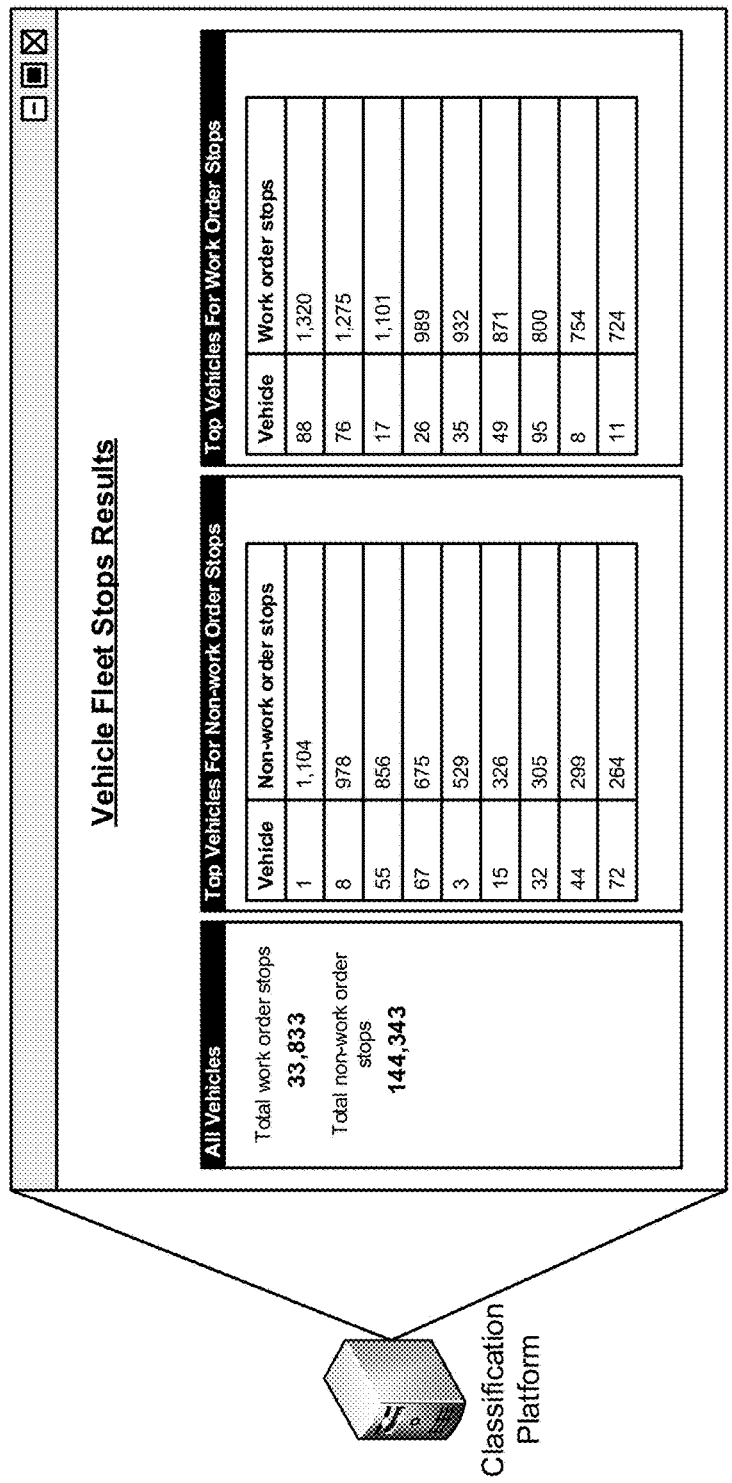

For example, as shown in FIG. 1H, the classification platform can provide a user interface that indicates a total number of work order stops (e.g., 33,833) and a total number of non-work order stops (e.g., 144,343) for all of the vehicles of the vehicle fleet. The user interface can provide a ranked list of vehicles, in the vehicle fleet, with the most non-work order stops (e.g., vehicle 1, vehicle 8, . . . , vehicle 72), and a portion providing a ranked list of vehicles with the most work order stops (e.g., vehicle 88, vehicle 76, . . . , vehicle 11). In some implementations, the classification platform can provide other information associated with work order stops 175 and non-work order stops 180, such as reports indicating stops per vehicle, overall stop statistics for all vehicles, a number of work stops per vehicle, a number of work stops per driver, a number of non-work stops per vehicle, a number of non-work stops per driver, and/or the like. In some implementations, the classification can provide a map or a timeline associated with a vehicle trip differently for a work stop and a non-work stop.

In some implementations, the classification of vehicle stops into work and non-work vehicle stops can enable vehicle fleet managers to log and make decisions about vehicle drivers. The classification of vehicle stops into work and non-work vehicle stops can be used to generate reports and alerts that provide enhanced insights to the vehicle fleet managers.

In this way, implementations described herein can provide a classification platform that utilizes machine learning to automatically classify vehicle stops as work related or non-work related based on location information associated with a fleet of vehicles. Classifying vehicle stops for a fleet of vehicles can help identify and reduce non-work related vehicle stops, which can reduce network resources that might otherwise be consumed during non-work related vehicle stops. Reducing non-work related vehicle stops can also conserve resources of the vehicles, reduce vehicle usage, reduce natural resource usage, and/or the like that might otherwise be consumed during non-work related vehicle stops. Furthermore, the classification platform can classify vehicle stops as work related or non-work related based on big data (e.g., hundreds, thousands, millions, hundreds of millions, and/or the like data points associated with hundreds, thousands, and/or the like vehicles) that cannot be physically processed by humans.

As indicated above, FIGS. 1A-1H are provided merely as an example. Other examples are possible and can differ from what was described with regard to FIGS. 1A-1H.

Figure 2:
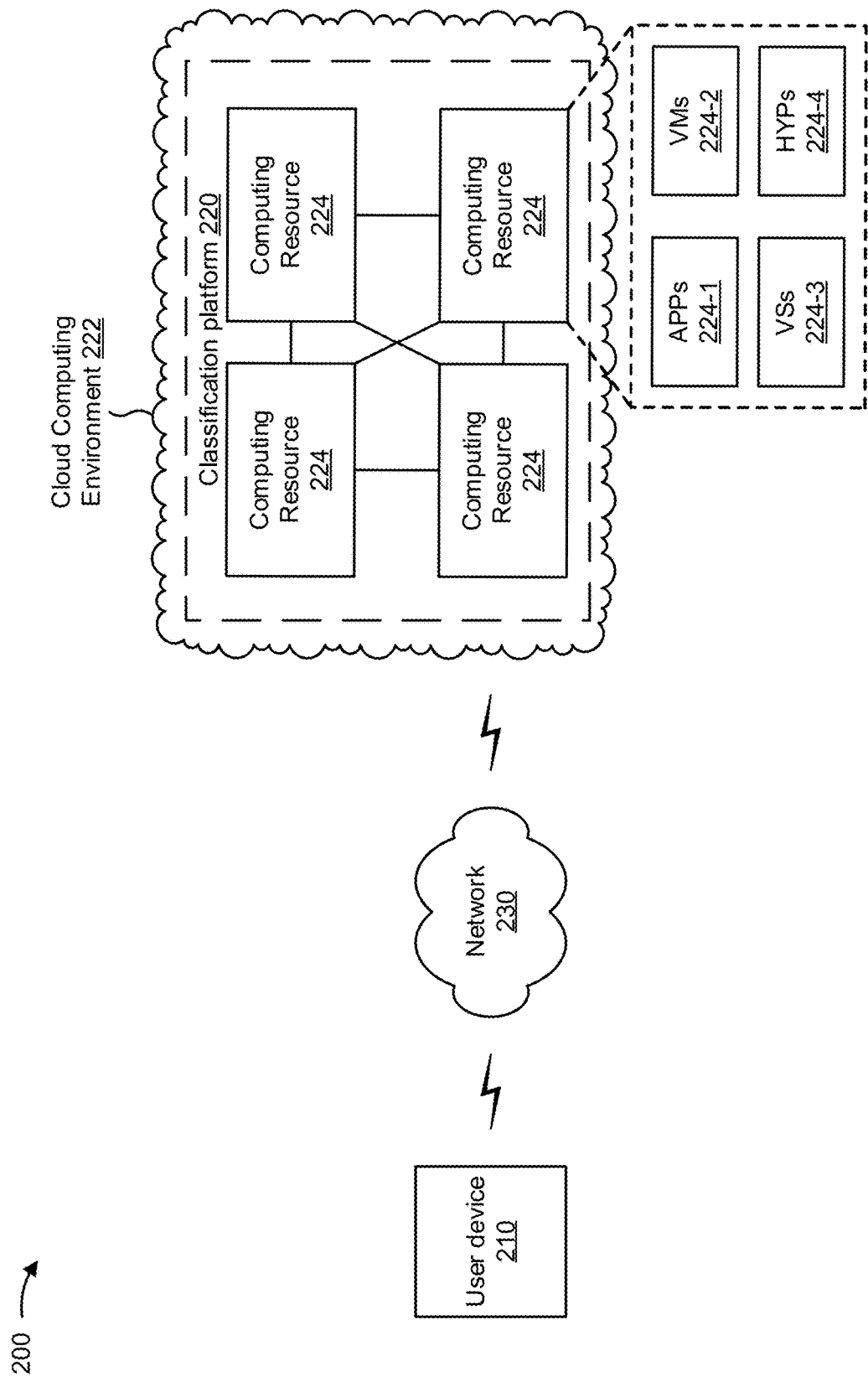
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, a classification platform 220, and a network 230. Devices of environment 200 can interconnect via wired connections, wireless connections, or a combination of wired and wireless connections.

User device 210 includes a device that is capable of communicating with one or more other devices included in environment 200. For example, user device 210 can include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a Global Positioning Satellite (GPS) device, an electronic control unit (ECU) of a vehicle, an engine control module (ECM) of a vehicle, or a similar type of device. In some implementations, user device 210 can be capable of receiving and/or providing location information and work order information, associated with a vehicle, from and/or to classification platform 220.

Classification platform 220 includes one or more devices that utilizes machine learning to determine a machine learning model and to automatically classify vehicle stops as work related or non-work related based on location information associated with a fleet of vehicles on the basis of the learned machine learning model. In some implementations, classification platform 220 can be designed to be modular such that certain software components can be swapped in or out depending on a particular need. As such, classification platform 220 can be easily and/or quickly reconfigured for different uses. In some implementations, classification platform 220 can receive information from and/or transmit information to one or more user devices 210 and/or one or more vehicles.

In some implementations, as shown, classification platform 220 can be hosted in a cloud computing environment 222. Notably, while implementations described herein describe classification platform 220 as being hosted in cloud computing environment 222, in some implementations, classification platform 220 cannot be cloud-based (i.e., can be implemented outside of a cloud computing environment) or can be partially cloud-based.

Cloud computing environment 222 includes an environment that hosts classification platform 220. Cloud computing environment 222 can provide computation, software, data access, storage, etc. services that do not require end-user knowledge of a physical location and configuration of system(s) and/or device(s) that hosts classification platform 220. As shown, cloud computing environment 222 can include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 can host classification platform 220. The cloud resources can include compute instances executing in computing resource 224, storage devices provided in computing resource 224, data transfer devices provided by computing resource 224, etc. In some implementations, computing resource 224 can communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that can be provided to or accessed by user device 210. Application 224-1 can eliminate a need to install and execute the software applications on user device 210. For example, application 224-1 can include software associated with classification platform 220 and/or any other software capable of being provided via cloud computing environment 222. In some implementations, one application 224-1 can send/receive information to/from one or more other applications 224-1, via virtual machine 224-2.

Virtual machine 224-2 includes a software implementation of a machine (e.g., a computer) that executes programs like a physical machine. Virtual machine 224-2 can be either a system virtual machine or a process virtual machine, depending upon use and degree of correspondence to any real machine by virtual machine 224-2. A system virtual machine can provide a complete system platform that supports execution of a complete operating system ("OS"). A process virtual machine can execute a single program, and can support a single process. In some implementations, virtual machine 224-2 can execute on behalf of a user (e.g., user device 210 or an operator of classification platform 220), and can manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 224-4 can provide hardware virtualization techniques that allow multiple operating systems (e.g., "guest operating systems") to execute concurrently on a host computer, such as computing resource 224. Hypervisor 224-4 can present a virtual operating platform to the guest operating systems, and can manage the execution of the guest operating systems. Multiple instances of a variety of operating systems can share virtualized hardware resources.

Network 230 includes one or more wired and/or wireless networks. For example, network 230 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
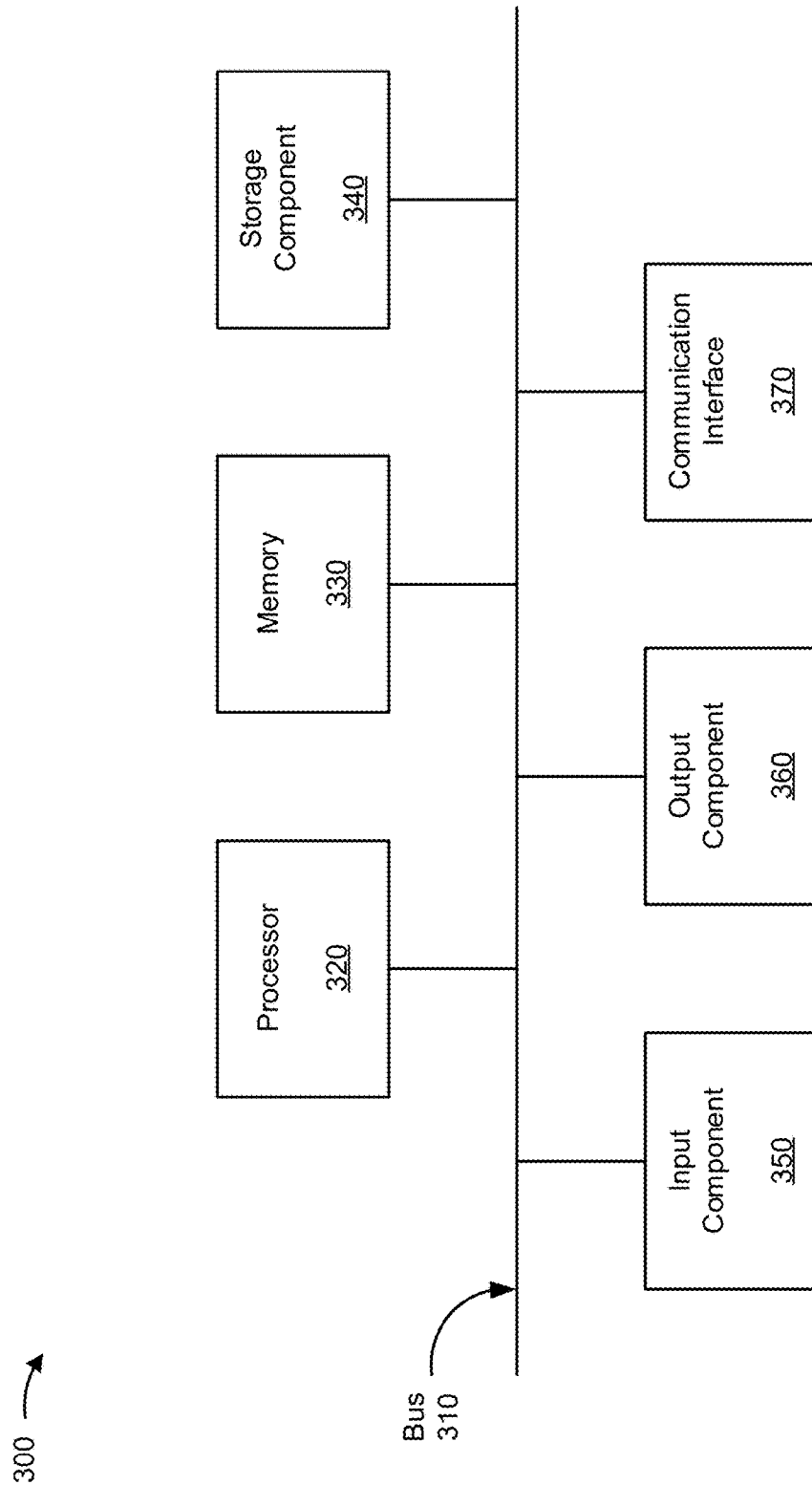
FIG. 3 is a diagram of example components of one or more devices of FIG. 2.

FIG. 3 is a diagram of example components of a device 300. Device 300 can correspond user device 210, classification platform 220, and/or computing resource 224. In some implementations, user device 210, classification platform 220, and/or computing resource 224 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
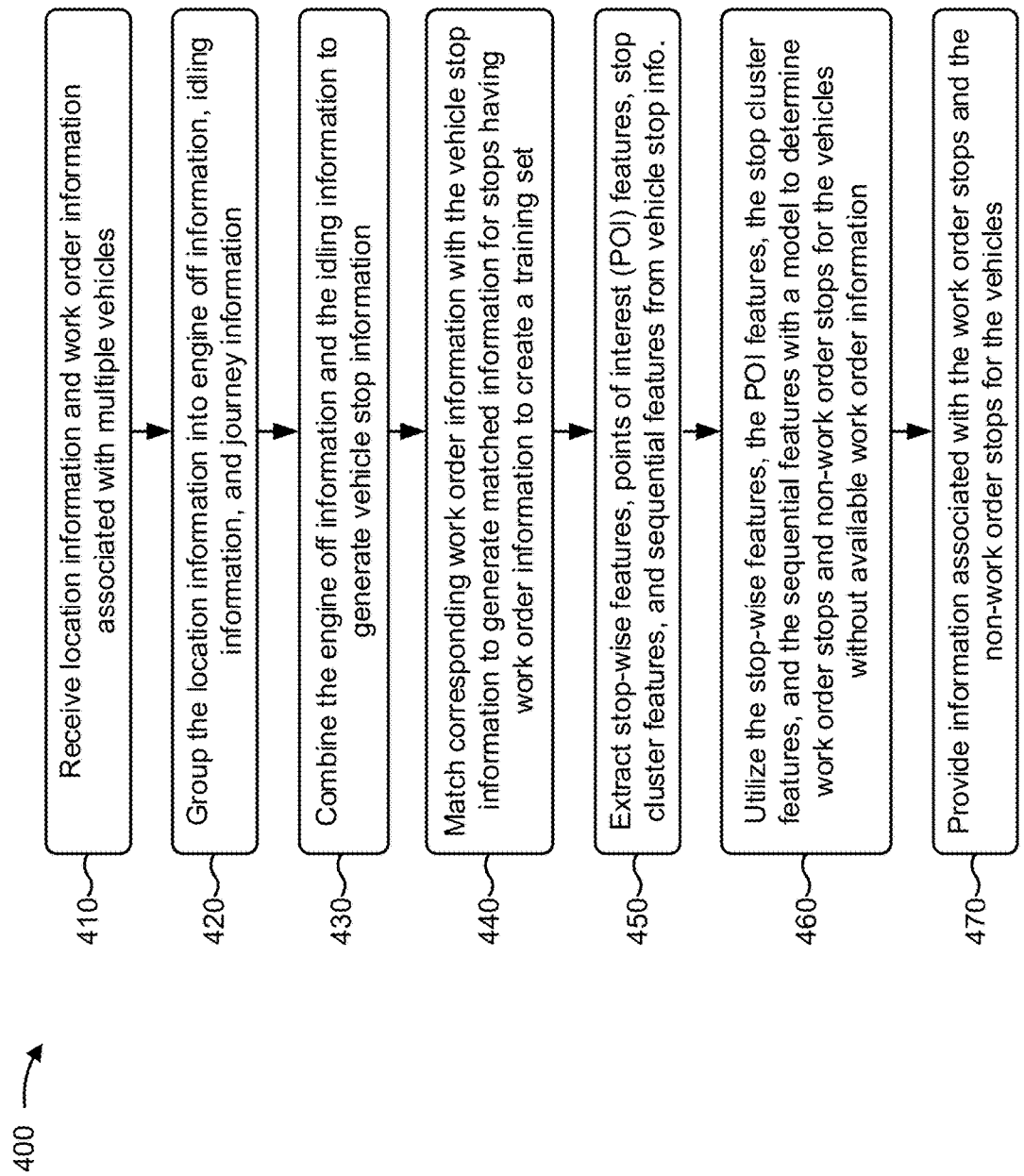
FIG. 4 is a flow chart of an example process for classifying vehicle stops as work related or non-work related.

FIG. 4 is a flow chart of an example process 400 for classifying vehicle stops as work related or non-work related. In some implementations, one or more process blocks of FIG. 4 can be performed by classification platform 220. In some implementations, one or more process blocks of FIG. 4 can be performed by another device or a group of devices separate from or including classification platform 220, such as user device 210.

As shown in FIG. 4, process can include receiving location information and work order information associated with multiple vehicles (block 410). For example, classification platform 220 can receive location information and work order information associated with multiple vehicles of a vehicle fleet. In some implementations, classification platform 220 can receive the location information from one or more of the multiple vehicles and/or from one or more user devices 210 associated with the multiple vehicles. In some implementations, classification platform 220 can receive the work order information from one or more of the multiple vehicles, one or more user devices 210 associated with the multiple vehicles, and/or from another source (e.g., from a vehicle fleet management system responsible for managing the vehicle fleet). In some implementations, user devices 210 can receive the work order information from one or more sensors provided in the multiple vehicles or from one or more sensors associated with user devices 210, and can provide the work order information to classification platform 220.

In some implementations, the location information for each vehicle can include information indicating a geographic location of the vehicle (e.g., in latitude and longitude), information indicating a velocity of the vehicle, and/or the like. For example, the location information can indicate that a vehicle is located at a particular latitude and longitude, a particular address, and/or the like. In some implementations, the work order information for each vehicle can include information indicating a schedule of work tasks to be completed by a driver of the vehicle over a period of time, information indicating locations of where the work tasks are to be completed, and/or the like. For example, the work order information can indicate that a vehicle is scheduled to deliver packages at different locations at different times of the day.

As further shown in FIG. 4, process 400 can include grouping the location information into engine off information, idling information, and journey information (block 420). For example, classification platform 220 can cluster or group the location information into engine off information, idling information, and journey information. In some implementations, classification platform 220 can utilize a rule-based clustering technique to group the location information into engine off information, idling information, and journey information.

In some implementations, the engine off information can include location information associated with engine off events (e.g., when the engines of the vehicles are turned off), and such location information can be generated when the engines are turned off. In some implementations, no location information is generated from the vehicles while the engines are turned off. In some implementations, the idling information can include location information associated with vehicles with engines turned on, but where the vehicles are not moving or are moving slowly in a small geographic area. In some implementations, the journey information can include location information that is not grouped into the engine off information and the idling information.

As further shown in FIG. 4, process 400 can include combining the engine off information and the idling information to generate vehicle stop information (block 430). For example, classification platform 220 can combine the engine off information and the idling information to generate vehicle stop information. In some implementations, classification platform 220 can chronologically sort the engine off information, the idling information, and the journey information, for each vehicle, before combining the engine off information and the idling information. In some implementations, the vehicle stop information can include consecutive engine off information and idling information that are not separated by journey information. In some implementations, each vehicle stop in the vehicle stop information can include a group of chronologically consecutive GPS signals that are associated with idling or engine off conditions and that satisfy spatiotemporal locality constraints. Each vehicle stop can include several characteristics, such as a number of aggregated GPS signals, a start and an end of the vehicle stop, a stop duration, maximum and minimum latitudinal and longitudinal coordinates of the GPS signals, and/or the like.

As further shown in FIG. 4, process 400 can include matching corresponding work order information with the vehicle stop information to generate matched information for stops having work order information to create a training set (block 440). For example, classification platform 220 can match corresponding work order information with the vehicle stop information to generate matched information for stops having work order information to create a training set. In some implementations, if the vehicle stop does not match a particular one of the work orders in the work order information, classification platform 220 can provide a designation (e.g., "None") indicating that the stop information does not match the particular one of vehicle stops. In some implementations, if work order information does not exist for a particular one of identified vehicle stops 135, the classification platform can provide a designation (e.g., "?") indicating that the work order information does not exist for the particular one of identified vehicle stops 135. In some implementations, classification platform 220 can combine a GPS signal associated with a matching vehicle stop (e.g., $P_{11}$) with corresponding work order information (e.g., $W_{11}$) to create a matched pair (e.g., $\{P_{11}, W_{11}\}$). In instances where the work order information does not match a vehicle stop, classification platform 220 can combine a GPS signal associated with the vehicle stop (e.g., $P_{18}$) with a non-match indicator (e.g., None) to create a pair (e.g., $\{P_{18}, \text{None}\}$). In instances where the work order information does not exist a particular identified vehicle stop, the classification platform can combine a GPS signal associated with the particular identified vehicle stop (e.g., $P_{288}$) with a non-existing indicator (e.g., ?) to create a pair (e.g., $\{P_{288}, ?\}$).

As further shown in FIG. 4, process 400 can include extracting stop-wise features, POI features, stop cluster features, and sequential features from the vehicle stop information (block 450). For example, classification platform 220 can extract stop-wise features, POI features, stop cluster features, and sequential features from the vehicle stop information. In some implementations, the stop-wise features can include features associated with a stop duration, a start time of the vehicle stop, time spent with the engine off, a geographic shape associated with a vehicle stop, a vehicle stop type, an odometer distance from a first GPS signal to a last GPS signal of the vehicle stop, a sum of haversine distances between consecutive GPS signals associated with the vehicle stop, a haversine distance between a first GPS signal and a last GPS signal of the vehicle stop, a total count of GPS signals associated with the vehicle stop, an average speed of the vehicle, a number of engine off GPS signals associated with the vehicle stop, and/or the like.

In some implementations, the POI features can include features associated with points of interest in a geographic area surrounding each vehicle stop. In some implementations, the POI features can include features identifying POI types, such as a bank, a university, a hotel, a restaurant, a rest area, a grocery store, a school, a shopping center, a gas station, an open parking area, a vehicle repair facility, and/or the like. For each of these POI types, classification platform 220 can generate a feature that includes information associated with a shortest distance from a location of the POI type to a location corresponding to an engine off GPS signal.

In some implementations, the stop cluster features can include features that describe characteristics of vehicle stops surrounding a particular vehicle stop, so that classification platform 220 can characterize a geographic area associated with the particular vehicle stop. In some implementations, classification platform 220, for each vehicle stop, can analyze a radius around the vehicle stop and collect statistics about surrounding vehicle stops.

In some implementations, the sequential features can include features associated with a sequence of vehicle stops performed by each vehicle prior to and after each vehicle stop.

As further shown in FIG. 4, process 400 can include utilizing the stop-wise features, the POI features, the stop cluster features, and the sequential features with a model to determine work order stops and non-work order stops for the vehicles without available work order information (block 460). For example, classification platform 220 can utilize the stop-wise features, the POI features, the stop cluster features, and the sequential features with a model to determine work order stops and non-work order stops for the vehicles without available work order information. In some implementations, classification platform 220 can utilize one of the stop-wise features, the POI features, the stop cluster features, or the sequential features to train a machine learning model. In some implementations, classification platform 220 can utilize a combination of one or more of the stop-wise features, the POI features, the stop cluster features, or the sequential features to train the machine learning model. In some implementations, classification platform 220 can utilize one or more of the stop-wise features, the POI features, the stop cluster features, or the sequential features with the trained machine learning model to determine information associated with work order stops (e.g., work related vehicle stops) and non-work order stops (e.g., non-work related vehicle stops).

In some implementations, work order stops 175 can include vehicle stops related to work orders, as determined by the location information and the work order information received from the vehicles and/or a vehicle fleet management system. For example, each of work order stops 175 can include a matched pair of information (e.g., $\{P_{Z9}, W_{Z9}\}$) that includes one or more GPS signals associated with an identified vehicle stop (e.g., $P_{Z9}$) and inferred work order information (e.g., $W_{Z9}$) for the identified vehicle stop.

In some implementations, non-work order stops 180 can include vehicle stops that are not related to work orders, as determined by the location information and the work order information received from the vehicles and/or a vehicle fleet management system. For example, each of non-work order stops 180 can include a matched pair of information (e.g., $\{P_{Z11}, \text{None}\}$) that includes one or more GPS signals associated with an identified vehicle stop (e.g., $P_{Z11}$) and an indication inferring that there is no corresponding work order information (e.g., None) for the identified vehicle stop.

In some implementations, classification platform 220 can utilize one or more of the stop-wise features, the POI features, the stop cluster features, and the sequential features with a random forest classifier model (e.g., which includes multiple decision trees) to determine work order stops and non-work order stops for the vehicles. In this case, classification platform 220 can utilize one or more of the stop-wise features, the POI features, the stop cluster features, and the sequential features to train the random forest classifier model.

In some implementations, classification platform 220 can train the random forest classifier model using a ten-fold cross validation procedure to choose an optimal number (T) and a maximum depth (D) of decision trees. In this case, classification platform 220 can apply an area under the receiver operating characteristic (AUROC) curve to evaluate the optimal number and the maximum depth of the decision trees. The AUROC curve represents a curve of variation of a false positive rate (FPR) with respect to a true positive rate (TPR) at different values of a classification threshold, where TPR=TP/(TP+FN), FPR=FP/(FP+TN), and TP, FP, TN and FN are the true positives, false positives, true negatives, and false negatives, respectively. In one example, classification platform 220 can vary T between 100 and 200, and can vary D among 12, 15, 20, 22, and 25 when training the random forest classifier model.

As further shown in FIG. 4, process 400 can include providing information associated with the work order stops and the non-work order stops for the vehicles (block 470). For example, classification platform 220 can provide information associated with the work order stops and the non-work order stops for the vehicles. In some implementations, classification platform 220 can provide the information associated with the work order stops and the non-work order stops for the vehicles to storage associated with classification platform 220. In some implementations, classification platform 220 can provide the information associated with the work order stops and the non-work order stops for display to a user of classification platform 220, to another device for display, and/or the like. For example, classification platform 220 can provide the information associated with the work order stops and the non-work order stops for the vehicles via a user interface as shown in FIG. 1H.

In some implementations, classification platform 220 can utilize the information associated with the work order stops and the non-work order stops to automatically perform a variety of functions. For example, in the future, if the vehicles are driverless, classification platform 220 can provide instructions, to a vehicle performing a non-work order stop, to alter a route or return to a home office. Classification platform 220 can send messages (e.g., via a fleet management system, a telephone call, a text message, and/or the like) to a vehicle fleet manager alerting the manager of unauthorized non-work order stops. Classification platform 220 can disable a vehicle determined to be performing or having performed a non-work order stop. Classification platform 220 can alter a work schedule associated with a particular vehicle that performed a non-work order stop (e.g., to reduce a number of work tasks), can send additional work tasks to user device 210 of another vehicle (e.g., work tasks that were previously scheduled for the particular vehicle). Based on weather or traffic information, and the information associated with the work order stops and the non-work order stops, classification platform 220 alter work schedules associated with one or more vehicles.

In some implementations, the random forest classifier model approach, utilized with the features described above, can be improved by additions and/or alterations. For example, the dataset described above, or a similar dataset, can be utilized for multi-class classification (e.g., by enlarging the set of stop purpose types beyond work order stops and non-work order stops).

Furthermore, additional sets of features can be utilized, such as features indicating an industry type. For example, different industry segments can have different work order characteristics. Additionally, based on the observation that information on previous and subsequent stops turned out to be quite effective, but perhaps less effective than expected, classification platform 220 can exploit the full sequence of stops by explicitly modeling the time component (e.g., with a graphical model or a recurrent neural network).

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Some implementations, described herein, can provide a classification platform that trains a machine learning model, based on known work order stops and non-work order stops, to generate a data set. The machine learning model, once trained with the data set, can automatically classify vehicle stops as work related (e.g., a work order stop) or non-work related (e.g., a non-work order stop) based on location (e.g., GPS) information and without knowing work order information associated with a fleet of vehicles. For example, the classification platform can receive the location information from user devices associated with the vehicles, and can identify stops associated with the vehicles by clustering or grouping the location information. The classification platform can extract stop-wise features, POI features, stop cluster features, and sequential features from information associated with the identified stops. The classification platform can utilize the stop-wise features, the POI features, the stop cluster features, and the sequential features to determine work order stops and non-work order stops associated with the vehicles.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
    identifying, by a device, vehicle stop information associated with a plurality of vehicles;
    analyzing, by the device, a radius associated with a particular vehicle stop identified in the vehicle stop information;
    determining, by the device, stop cluster features based on statistics associated with vehicle stops within the radius surrounding the particular vehicle stop;
    determining, by the device, work order stops and non-work order stops for the plurality of vehicles by utilizing the stop cluster features with a model; and
    providing, by the device, information associated with the work order stops and the non-work order stops for the plurality of vehicles.

2. The method of claim 1, wherein the statistics associated with the vehicle stops within the radius surrounding the particular vehicle stop includes one or more of:
    a vehicle entropy associated with a set of vehicle stops of the vehicle stops within the radius surrounding the particular vehicle stop,
    an average duration associated with the set of vehicle stops,
    a maximum duration associated with the set of vehicle stops, or
    a minimum duration associated with the set of vehicle stops.

3. The method of claim 1, wherein the stop cluster features include features that describe characteristics of the vehicle stops within the radius surrounding the particular vehicle stop.

4. The method of claim 1, wherein determining the work order stops and the non-work order stops comprises:
    utilizing the stop cluster features and sequential features with the model to determine the work order stops and the non-work order stops for the plurality of vehicles,
        wherein the sequential features comprise features associated with a sequence of vehicle stops performed by a vehicle of the plurality of vehicles.

5. The method of claim 1, wherein determining the work order stops and the non-work order stops comprises:
utilizing the stop cluster features and stop-wise features with the model to determine the work order stops and the non-work order stops for the plurality of vehicles, wherein the stop-wise features include at least one of:
a feature associated with vehicle stop duration, or
a total quantity of location signals associated with a vehicle stop of a plurality of vehicle stops identified by the vehicle stop information.

6. The method of claim 1, wherein determining the work order stops and the non-work order stops comprises:
training, based on the stop cluster features, the model to generate a trained model; and
determining the work order stops and the non-work order stops based on the trained model.

7. The method of claim 1, further comprising:
performing one or more actions based on the information associated with the work order stops and the non-work order stops,
wherein the one or more actions include one or more of:
disabling a first vehicle of the plurality of vehicles,
altering a work schedule associated with a second vehicle of the plurality of vehicles, or
sending an additional work task to a third vehicle of the plurality of vehicles.

8. A non-transitory computer-readable medium storing a set of instructions, the set of instructions comprising:
one or more instructions that, when executed by one or more processors of a device, cause the device to:
identify vehicle stop information associated with a plurality of vehicles;
analyze a radius associated with a particular vehicle stop identified in the vehicle stop information;
determine stop cluster features based on statistics associated with vehicle stops within the radius surrounding the particular vehicle stop;
determine work order stops and non-work order stops for the plurality of vehicles by utilizing the stop cluster features with a model; and
provide information associated with the work order stops and the non-work order stops for the plurality of vehicles.

9. The non-transitory computer-readable medium of claim 8, wherein the statistics associated with the vehicle stops within the radius surrounding the particular vehicle stop includes one or more of:
a vehicle entropy associated with a set of vehicle stops of the vehicle stops within the radius surrounding the particular vehicle stop,
an average duration associated with the set of vehicle stops,
a maximum duration associated with the set of vehicle stops, or
a minimum duration associated with the set of vehicle stops.

10. The non-transitory computer-readable medium of claim 8, wherein the stop cluster features include features that describe characteristics of the vehicle stops within the radius surrounding the particular vehicle stop.

11. The non-transitory computer-readable medium of claim 8, wherein the one or more instructions, that cause the device to determine the work order stops and the non-work order stops, cause the device to:
utilize the stop cluster features and sequential features with the model to determine the work order stops and the non-work order stops for the plurality of vehicles, wherein the sequential features comprise features associated with a sequence of vehicle stops performed by a vehicle of the plurality of vehicles.

12. The non-transitory computer-readable medium of claim 8, wherein the one or more instructions, that cause the device to determine the work order stops and the non-work order stops, cause the device to:
utilize the stop cluster features and stop-wise features with the model to determine the work order stops and the non-work order stops for the plurality of vehicles, wherein the stop-wise features include at least one of:
a feature associated with vehicle stop duration, or
a total quantity of location signals associated with a vehicle stop of a plurality of vehicle stops identified by the vehicle stop information.

13. The non-transitory computer-readable medium of claim 8, wherein the one or more instructions, that cause the device to determine the work order stops and the non-work order stops, cause the device to:
train, based on the stop cluster features, the model to generate a trained model; and
determine the work order stops and the non-work order stops based on the trained model.

14. The non-transitory computer-readable medium of claim 8, wherein the one or more instructions, when executed by the one or more processors, further cause the one or more processors to:
provide, for display, a ranked list of vehicles based on the information associated with the work order stops and the non-work order stops for the plurality of vehicles.

15. A device, comprising:
one or more processors configured to:
identify vehicle stop information associated with a plurality of vehicles;
analyze a radius associated with a particular vehicle stop identified in the vehicle stop information;
determine stop cluster features based on statistics associated with vehicle stops within the radius surrounding the particular vehicle stop;
determine work order stops and non-work order stops for the plurality of vehicles by utilizing the stop cluster features with a model; and
provide information associated with the work order stops and the non-work order stops for the plurality of vehicles.

16. The device of claim 15, wherein the statistics associated with the vehicle stops within the radius surrounding the particular vehicle stop includes one or more of:
a vehicle entropy associated with a set of vehicle stops of the vehicle stops within the radius surrounding the particular vehicle stop,
an average duration associated with the set of vehicle stops,
a maximum duration associated with the set of vehicle stops, or
a minimum duration associated with the set of vehicle stops.

17. The device of claim 15, wherein the stop cluster features include features that describe characteristics of the vehicle stops within the radius surrounding the particular vehicle stop.

18. The device of claim 15, wherein the one or more processors, when determining the work order stops and the non-work order stops, are configured to:
utilize the stop cluster features and sequential features with the model to determine the work order stops and the non-work order stops for the plurality of vehicles, wherein the sequential features comprise features associated with a sequence of vehicle stops performed by a vehicle of the plurality of vehicles.

19. The device of claim 15, wherein the one or more processors, when determining the work order stops and the non-work order stops, are configured to:
utilize the stop cluster features and stop-wise features with the model to determine the work order stops and the non-work order stops for the plurality of vehicles, wherein the stop-wise features include at least one of:
a feature associated with vehicle stop duration, or
a total quantity of location signals associated with a vehicle stop of a plurality of vehicle stops identified by the vehicle stop information.

20. The device of claim 15, wherein the one or more processors, when determining the work order stops and the non-work order stops, are configured to:
train, based on the stop cluster features, the model to generate a trained model; and
determine the work order stops and the non-work order stops based on the trained model.

* * * * *